United States Patent [19]

Steinblatt et al.

[11] Patent Number: 5,208,888
[45] Date of Patent: May 4, 1993

[54] COUPLING DEVICE FOR COUPLING A LASER BEAM INTO AN OPTICAL FIBRE

[75] Inventors: Serge Steinblatt, Raanana; Dov Berman, Hofit; Yossi Kamir, Netanya, all of Israel

[73] Assignee: Scitex Corporation Ltd., Herzlia Bet, Israel

[21] Appl. No.: 877,503

[22] Filed: May 1, 1992

[30] Foreign Application Priority Data

May 22, 1991 [IL] Israel .................................. 98216

[51] Int. Cl.$^5$ .............................................. G02B 6/42
[52] U.S. Cl. ............................................... 385/90
[58] Field of Search ............................... 385/88–92

[56] References Cited

U.S. PATENT DOCUMENTS 5,042,890  8/1991  Wehrle et al. ................... 385/90

Primary Examiner—Akm E. Ullah
Attorney, Agent, or Firm—Benjamin J. Barish

[57] ABSTRACT

A coupling device for coupling a laser beam into an optical fibre includes a base plate carrying a laser holder and an optical fibre holder substantially aligned with each other along a common axis. The optical fibre holder includes an inner housing disposed within an outer housing and formed with a bore for receiving the end of the optical fibre. One housing includes pin adjusting means for adjusting the received end of the optical fibre substantially parallel to the common axis; and the other housing includes pin adjusting means for adjusting the received end of the optical fibre substantially perpendicularly and/or angularly to the common axis.

19 Claims, 4 Drawing Sheets

COUPLING DEVICE FOR COUPLING A LASER BEAM INTO AN OPTICAL FIBRE

FIELD AND BACKGROUND OF THE INVENTION

The present invention relates to coupling devices, and particularly to such devices for coupling (sometimes called "launching") a free space laser beam into an optical fibre.

The coupling or launching of a laser beam into a single mode optical fibre is problematic because of the small fibre core diameter (around 5 microns). In order to have high coupling efficiency, the laser beam must be focussed to a spot with a diameter close to that of the fibre core. Not only high precision, but also high stability is required against mechanical drifts because of temperature cycles, laser warmup and cool down, strain release at mechanical adjustment points, and the like.

Mechanically adjusted systems are usually based on a tilting unit which is mounted on the laser front face and holds the end of the optical fibre. The tilt is applied simultaneously to the fibre and to the focussing lens. No translation adjustments are usually provided because the laser beam is sufficiently concentric with the mechanical fixing points on the laser front face. However, replacement of a laser is problematic because the front face may not be sufficiently perpendicular for this purpose to the beam, and therefore may require inconvenient adjustments to provide a good coupling (launching) efficiency. This may be avoided be equipping the laser with prealigned optics and a high precision optical plug, and the fibre with a high precision connector. However, such an arrangement is very expensive. Moreover, temperature changes (e.g., because of laser warmup and cool down) may result in mechanical drifts, thereby requiring further adjustments.

According to another coupling arrangement, the fibre end may be moved in front of the fixed lens, but this requires a set of at least two micrometric translation stages with submicron resolution; moreover, long term stability is also difficult to achieve.

Another technique for attaining the required high precision and high stability is to use an active positioning system in which the position of the optical fibre with respect to the laser beam is continuously detected and corrected by motors where necessary. Such active systems, however, are very expensive.

OBJECTS AND BRIEF SUMMARY OF THE INVENTION

An object of the present invention is to provide a coupling (or launching) device for coupling the laser beam into an optical fibre havign a number of advantages over the known arrangements, including low cost, high efficiency, long term stability and/or easy laser replacement.

According to the present invention, there is provided a coupling device for coupling a laser beam into an optical fibre, comprising a base plate carrying a laser holder and an optical fibre holder substantially aligned with each other along a common axis. The optical fibre holder includes an outer housing, and an inner housing disposed within the outer housing. The inner housing is formed with a bore for receiving the end of the optical fibre. One of the housings includes first pin adjusting means for adjusting the received end of the optical fibre substantially parallel to the common axis; and the other of the housings includes second pin adjusting means for adjusting the received end of the optical fibre substantially perpendicularly to the common axis.

According to further features in the preferred embodiment of the invention described below, the inner housing includes the first pin adjusting means, and the outer housing includes the second pin adjusting means. The inner housing further includes a focussing lens carried at its end facing the laser holder and substantially aligned therewith along the common axis.

According to still further features in the described preferred embodiment, the second adjusting means comprises a pair of springs interposed between the outer housing and the inner housing at one side of the inner housing and spaced along the connom axis; a first pair of threaded pins threaded in a common plane into the outer housing and towards the inner housing at the side thereof opposite to the springs; and a second pair of threaded pins threaded in a common plane into the outer housing and towards the inner housing at the side thereof opposite to the springs and spaced from the first pair of threaded pins along the common axis.

According to still further features in the described preferred embodiment, each of the springs is of elastomeric material. Particularly goods results have been obtained where the elastomeric material is polyurethane.

A coupling device constructed in accordance with the foregoing features has been found to provide high coupling efficiency and long term stability. Moreover, it may be built of a relatively few simple parts which can be produced and assembled at relatively low cost. Further, it permits easy laser replacement with a minimum of readjustment. It is also suited for monomode optical fibres in the visible light spectrum, i.e., fibres having core diameters of between 4 to 6 microns.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
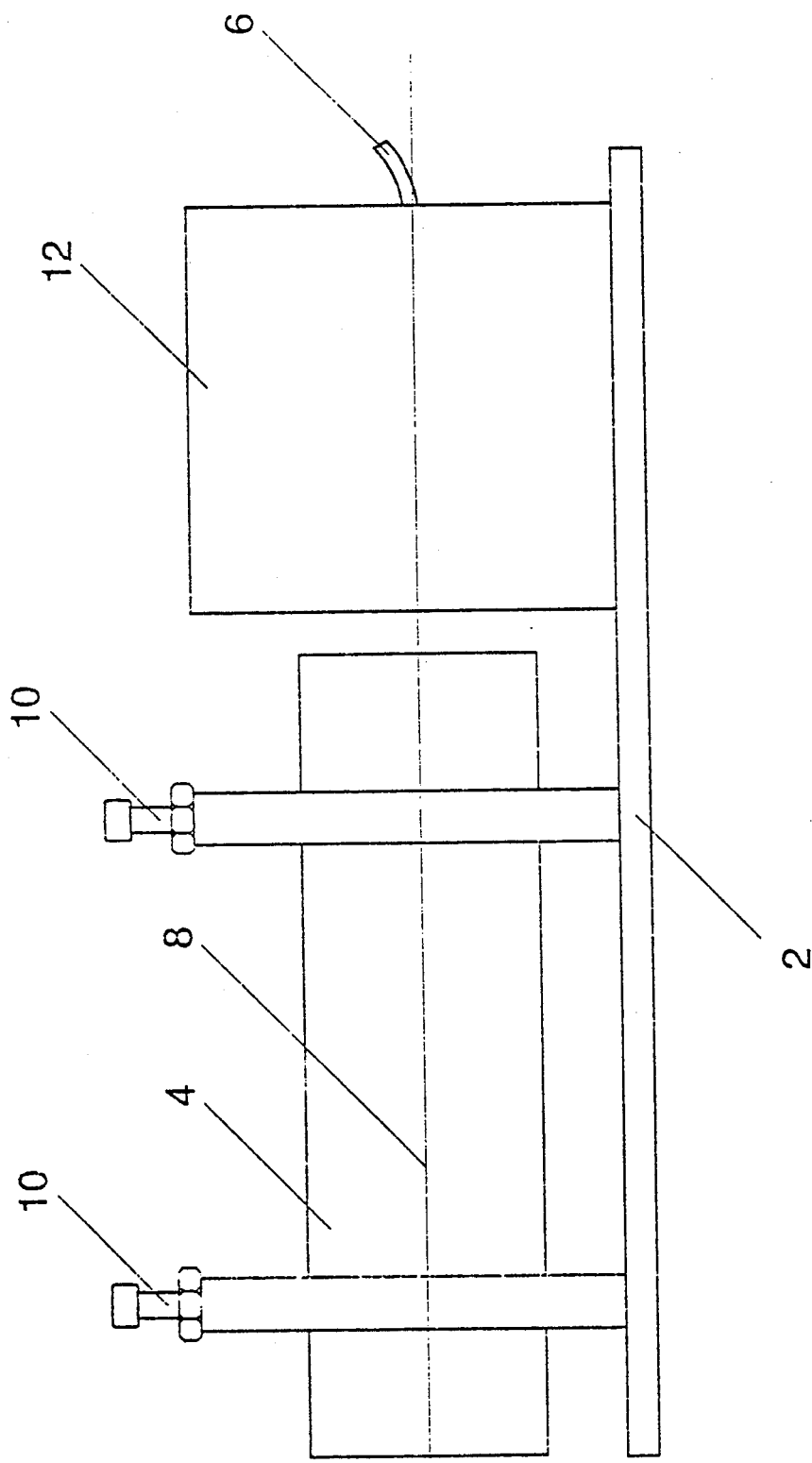
FIG. 1 is a block diagram illustrating one form of coupling device constructed in accordance with the present invention.
Figure 2:
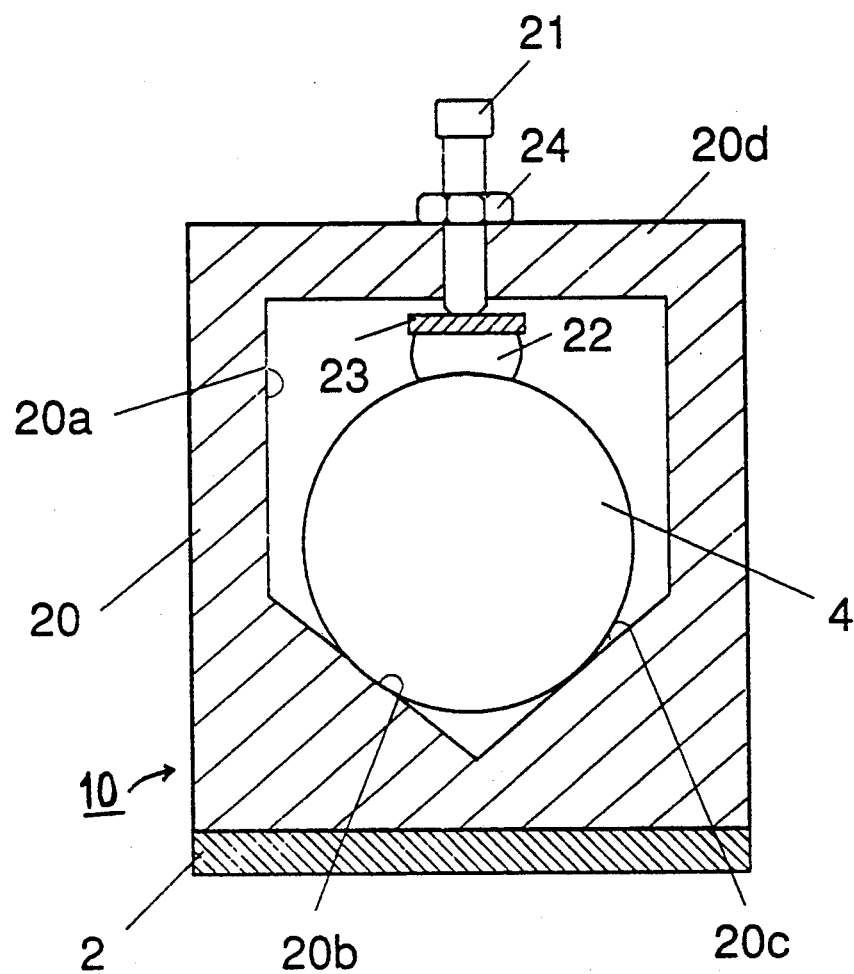
FIG. 2 is a transverse sectional view more particularly illustrating the construction of the laser holder in the coupling device of FIG. 1.
Figure 3:
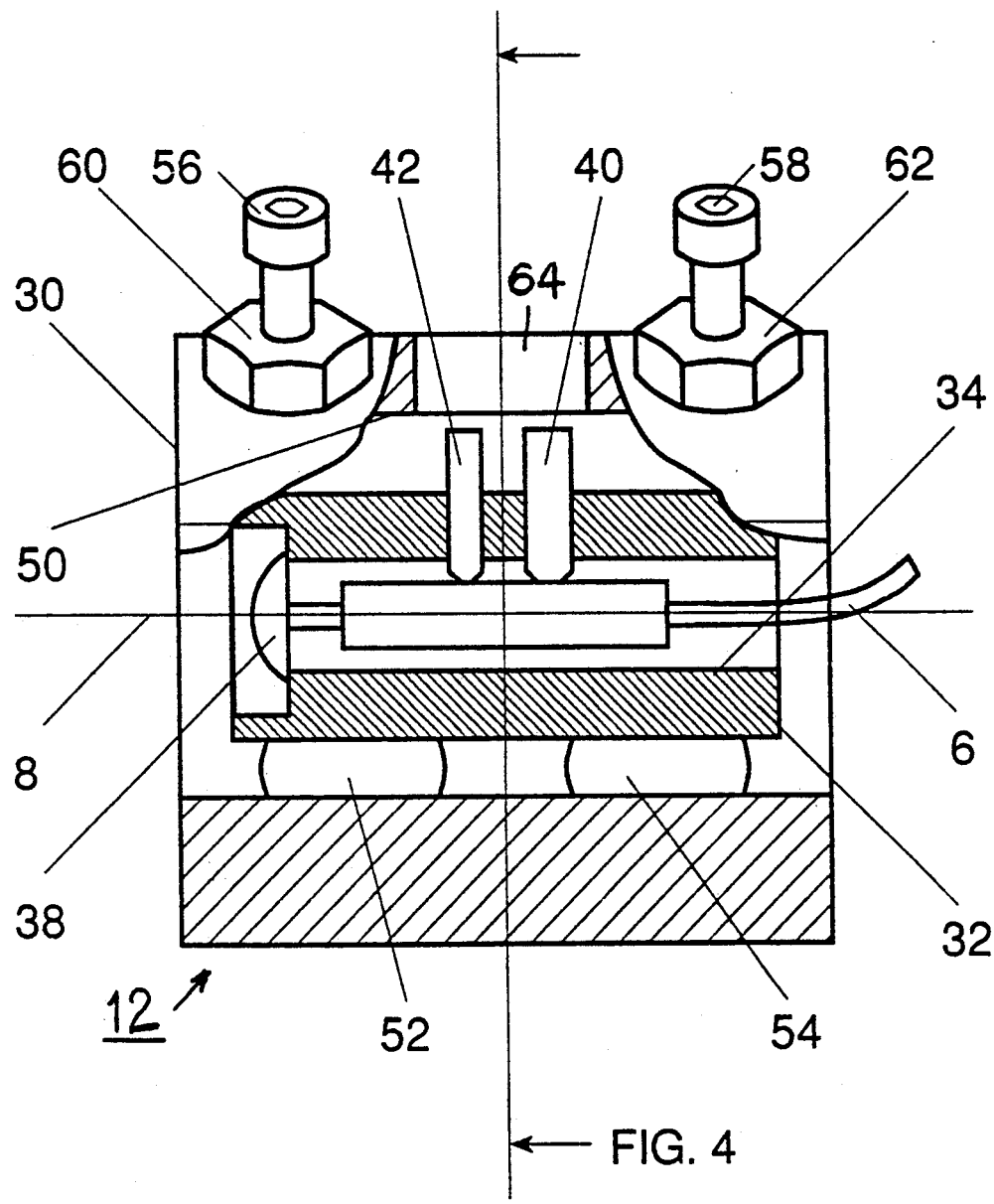
FIG. 3 is a three-dimensional view more particularly illustrating the optical fibre holder in the coupling device of FIG. 1.
Figure 4:
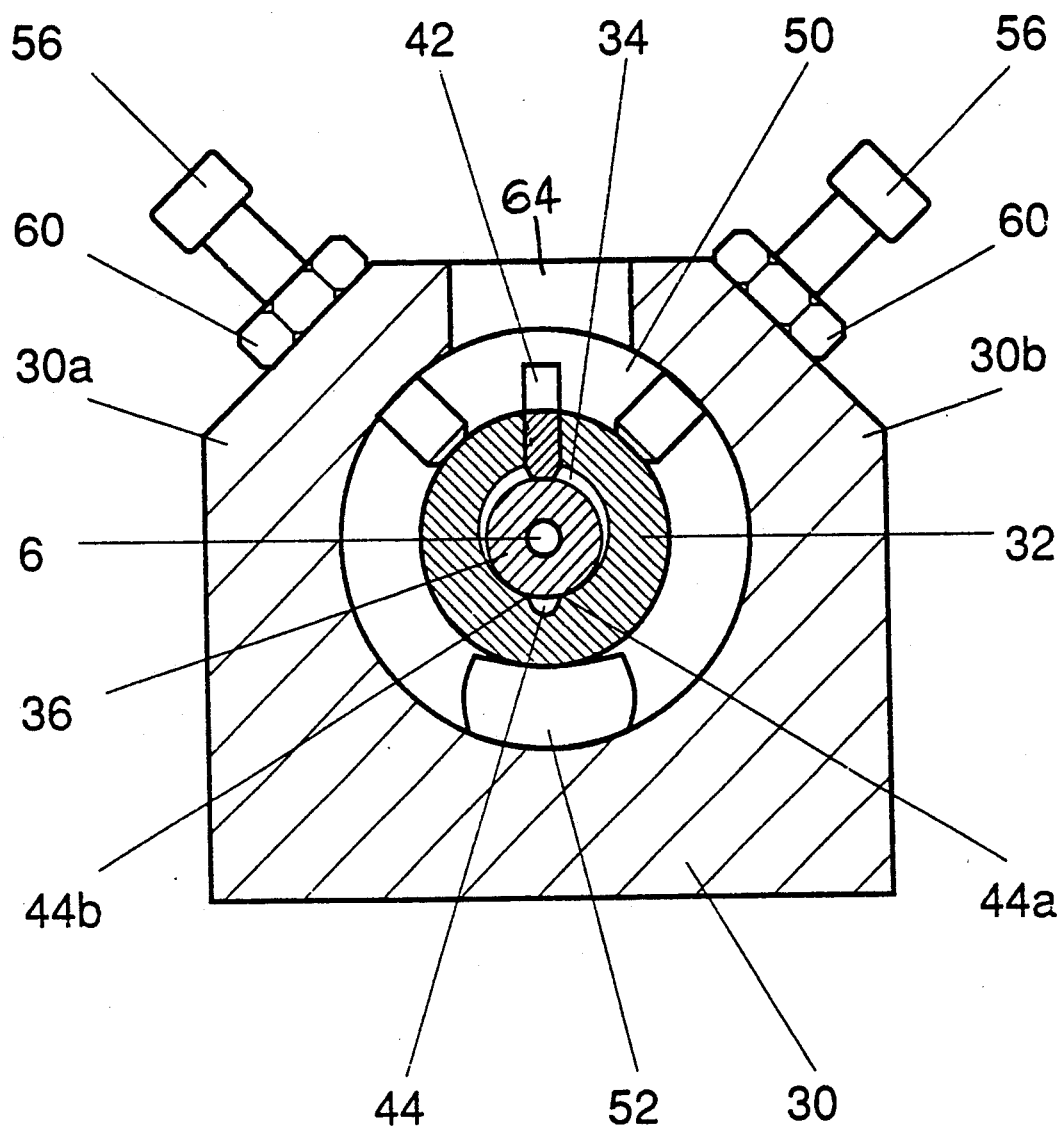
FIG. 4 is a longitudinal sectional view of the optical fibre holder of FIG. 3.

With reference first to FIG. 1, there is illustrated one form of coupling device in accordance with the invention comprising a base plate 2 carrying a holder for a laser 4 and a holder for one end of an optical fibre 6 in substantial alignment with each other along a common axis 8. The holder for laser 4 is constituted of two clamping members 10, each having a construction as illustrated in FIG. 2, fixed to the common base 2 and engageable with the opposite ends of the laser 4. The optical fibre holder, indicated at 12 in FIG. 1 and more particularly illustrated in FIGS. 3–5, is also fixed to the common base 2 in alignment with the two laser holder clamps 10.

With reference in FIG. 2 illustrating the construction of each of the laser holder clamps 10, it will be seen that each clamp includes a body member 20 formed with an opening 20a of substantially rectangular configuration except for its lower surfaces 20b, 20c which are of a V-shaped configuration for engagement with the lower surface of the laser 4. A pin 21 is threaded through the top wall 20d of body member 20 towards laser 4, and a spring 22 is interposed between the inner tip of the threaded pin 21 for applying pressure to the laser according to the amount of threading of pin 21. A washer 23 is interposed between the end of pin 21 and spring 22 for distributing the pressure along a substantial surface of the laser 4. Pin 21 may be locked in position by lock nut 24.

Spring 22 is an elastomeric spring, preferably of polyurethane. In its original unstrained condition, it is of cylindrical configuration, but deforms when strained to firmly engage the upper surface of the laser 4.

It will thus be seen that when the pins 21 of the two clamps 10 are threaded into their respective body members 20, their elastomeric springs 22 engage the opposite ends of the laser 4 and press the laser firmly against the V-shaped surfaces 20b, 20c of the respective clamping members.

The optical fibre holder 12, as illustrated particularly in FIGS. 3 and 4, comprises an outer housing 30 and an inner housing 32 disposed within the outer housing. The inner housing 32 is formed with a bore 34 receiving a metal ferrule 36 secured to the inner end of the optical fibre 6. Inner housing 32 also carries a focussing lens 38 at its end facing the laser 4. Lens 38 is fixed to the inner housing 32, but the ferrule 36 secured to the end of the optical fibre 6 is axially adjustable within bore 34 by means of a retainer (spring-biassed) pin 40 and a lock pin 42 both threaded through one wall of the housing. Thus, when axially adjusting the end of optical fibre 6 carrying the metal ferrule 36, lock screw 42 is loosened so that the retainer pin 40 permits the end of the optical fibre 6 carrying ferrule 36 to be adjusted and retains it in its adjusted position until lock screw 42 is tightened to firmly engage the ferrule 36 and thereby to lock the optical fibre in its axially-adjusted position.

As shown particularly in FIG. 4, bore 34 formed in the inner housing 32, is only of slightly larger diameter than ferrule 36 carried at the inner end of the optical fibre 6 so as to permit free axial movement of the ferrule, but limited lateral movement. The undersurface of bore 34 is formed with a slot 44, aligned with retainer pin 40 and lock pin 42, and extending parallel to the axis of movement of ferrule 36 (i.e., parallel to the longitudinal axis 8, FIG. 1, FIG. 3). Slot 44 defines a pair of parallel edges 44a, 44b on its opposite sides which are engageable with the metal ferrule 36 of the optical fibre 6 and guides its adjustment parallel to axis 8.

The outer housing 30 is formed with a bore 50 of cylindrical configuration for receiving the inner housing 32. A pair of springs 52, 54 are interposed between the outer housing 30 and the inner housing 32 at the lower side of the inner housing and spaced along axis 8.

Housing 30 further includes two pairs of threaded pins 56, 58 extending through its upper wall and engageable with the inner housing 32. The two pins 56 are threaded through the upper wall of housing 30 to occupy a common plane substantially including the focussing lens 38 at one end of the inner housing. The other two pins 58 are threaded through the upper wall of the housing, also in a common plane, at an axially spaced location from threaded pins 56, and are engageable with the opposite end of the inner housing 32. Each threaded pin includes a locking washer 60, 62 for locking the pin in place.

The upper end of housing 30 further includes an opening 64 aligned with the retainer pin 40 and lock pin 42 carried by the inner housing 32 to provide access to those pins.

Springs 52, 54 engageable with the opposite ends of the inner housing 32 are also elastomeric springs, preferably of polyurethane, and also of a cylindrical configuration in their normal unstrained conditions, as elastomeric spring 24 in the laser holder assembly illustrated in FIG. 2.

The two threaded pins in each of the two pairs 56, 58 are disposed at an angle, preferably about 90°, to each other. The outer face of the outer housing 30 is formed with flat inclined surfaces 30a, 30b through which these pins 56, 58 are threaded. Such an arrangement provides convenient access to the threaded pins.

The manner of mounting and adjusting the optical fibre 6 with respect to laser 4 will be apparent from the above description. Thus, the metal ferrule 36, secured to the end of the optical fibre 6 to be coupled to the laser 4, is inserted into bore 34 of the inner housing 32 and may be retained in axial position by the retainer 40 until final adjustment is made, at which time it is locked in position by the locking pin 42. Pins 40 and 42 permit adjustment of the optical fibre 6 in the axial direction, i.e., parallel to the common axis 8 between the laser holder clamps 10 and the optical fibre holder 12 of FIG. 1. This axial adjustment is guided by the opposite edges 44a, 44b of slot 44 FIG. 5).

The lateral and angular adjustment of the optical fibre 6 is effected by the two pairs of threaded pins 56, 58 engageable with one side of the inner housing 32, and the elastomeric springs 52, 54 engageable with the opposite side of the inner housing. This adjustment of the inner housing 32, and thereby of the end of the optical fibre 6, can be made not only in the direction perpendicularly to the common axis 8, but also in any direction with respect to the common axis, by merely appropriately adjusting the two pairs of threaded pins 56, 58.

It has been found that a coupling device constructed as illustrated in the drawings provides high coupling efficiency and long term stability, permits easy laser replacement with a minimum of readjustment, and is suited for monomode optic fibres in the visible light spectrum having core diameters of the order of 4–6 microns. Moreover, it can be built of relatively few simple parts which can be produced and assembled at relatively low cost.

While the invention has been described with respect to one preferred embodiment, it will be appreciated that many variations, modifications and other applications of the invention may be made.

What is claimed is:

1. A coupling device for coupling a laser beam into an optical fibre, comprising:
   a base plate carrying a laser holder and an optical fibre holder substantially aligned with each other along a common axis;
   said optical fibre holder including an outer housing, and an inner housing disposed within said outer housing;

said inner housing being formed with a bore for receiving he end of the optical fibre;

one of said housings including first pin adjusting means for adjusting said received end of the optical fibre substantially parallel to said common axis;

the other of said housings including second pin adjusting means for adjusting said received end of the optical fibre substantially perpendicularly to said common axis.

2. The coupling device according to claim 1, wherein said inner housing includes said first pin adjusting means, and said outer housing includes said second pin adjusting means.

3. The coupling device according to claim 2, wherein said inner housing further includes a focussing lens carried at the end of the inner housing facing the laser holder and substantially aligned therewith along said common axis.

4. The coupling device according to claim 3, wherein said second pin adjusting means comprises:

a pair of springs interposed between the outer housing and the inner housing at one side of the inner housing and spaced along said common axis;

a first pair of threaded pins threaded in a common plane into said outer housing and towards said inner housing at the side thereof opposite to said springs;

and a second pair of threaded pins threaded in a common plane into said outer housing and towards said inner housing at the side thereof opposite to said springs and spaced from said first pair of threaded pins along said common axis.

5. The coupling device according to claim 4, wherein the plane of said first pair of threaded pins passes through said focusing lens at one end of the inner housing, and the plane of said second pair of threaded pins passes through the opposite end of said inner housing.

6. The coupling device according to claim 4, wherein each threaded pin is disposed at an angle of about 90° with respect to the other threaded pin of the respective pair.

7. The coupling device according to claim 4, wherein each of said springs is of elastomeric material.

8. The coupling device according to claim 7, wherein said elastomeric material is polyurethane.

9. The coupling device according to claim 7, wherein each of said springs of elastomeric material is of cylindrical configuration.

10. The coupling device according to claim 2, wherein said end of the optical fibre received in the inner housing is enclosed in a metal ferrule.

11. The coupling device according to claim 10, wherein said first pin adjusting means comprises a locking pin threaded through said inner housing and engageable with said metal ferrule of the optical fibre to lock same against axial movement within the inner housing.

12. The coupling device according to claim 11, wherein said first pin adjusting means further comprises a retainer pin threaded toward said inner housing and formed with a spring plunger engageable with said metal ferrule of the optical fibre to releasably retain the optical fibre in place until locked in place by the locking pin.

13. The coupling device according to claim 12, wherein the outer housing is formed with an access opening aligned with said locking pin and retainer pin.

14. The coupling device according to claim 10, wherein said outer housing is formed with a cylindrical bore, and the inner housing is of cylindrical shape and has an outer diameter slightly smaller than the inner diameter of the outer housing.

15. The coupling device according to claim 10, wherein the inner face of said inner housing is formed with a slot extending substantially parallel to said common axis and having parallel edges engageable with the metal ferrule of the optical fibre for guiding its adjustment parallel to said common axis.

16. The coupling device according to claim 1, wherein said laser holder is formed with a V-shaped surface engageable with the lower face of the laser, and includes pressure means engageable with the upper face of the laser for pressing the laser against said V-shaped surface.

17. The coupling device according to claim 16, wherein said pressure means comprises a threaded pin threaded through the outer housing towards said laser, and an elastomeric spring interposed between said threaded pin and the laser.

18. The coupling device according to claim 17, wherein said elastomeric spring is of polyurethane.

19. The coupling device according to claim 17, wherein said pressure means further comprises a rigid washer interposed between said threaded pin and said elastomeric spring.

* * * * *